UNITED STATES PATENT OFFICE.

WALTER ALEXANDER, OF NEW YORK, N. Y.

ADHESIVE.

1,337,381.     Specification of Letters Patent.     Patented Apr. 20, 1920.

No Drawing.     Application filed February 8, 1917. Serial No. 147,329.

*To all whom it may concern:*

Be it known that I, WALTER ALEXANDER, a citizen of the United States, residing in the borough of Manhattan, city, county, and State of New York, have invented certain new and useful Improvements in Adhesives, of which the following is a specification.

I have discovered that the addition of a relatively small percentage of a boron derivative imparts to certain silicate compounds an extra body and an extra adhesiveness, and that, when they are used as adhesives or binding compounds, it increases the tensile strength of the compound while imparting thereto the drying properties common to animal and vegetable glues. This discovery I have usefully applied to the production of what may be termed a mineral adhesive which is characterized both by an absence of the undesirable tendency to deterioration inherent in animal and vegetable adhesives, being free from liability to fermentation, decay, or mold, and by the presence of the desired properties in such adhesives to a hitherto unattained degree.

My improved adhesive is formed from water-soluble alkaline, silicic and boric ingredients compounded as hereinafter set forth.

In forming my mineral adhesive, I dissolve a water-soluble alkali base, for example, sodium carbonate, preferably with heat sufficient to expedite the solution; to this I add a water-soluble boron salt, for example, borax, or preferably, the deca-hydrate of sodium tetraborate, employing heat until an apparent solution is attained; to this compound I add a water-soluble salt of silicon dioxid, for example, sodium silicate, and mix by agitation under continued heat, until the composition becomes perfectly clear. The composition produced will be a highly viscous adhesive of syrupy consistency adapted for use as a mucilage, glue, or as an adhesive stiffener and binder, dependent upon its consistency, which may be thinned with water as desired, with drying properties similar to adhesives having animal or vegetable origin.

As a water-soluble alkali base, I employ sodium hydroxid, either in the form of soda-lye or caustic soda, but a less alkaline salt is usually preferable, such as commercial sodium carbonate. In producing my mineral adhesive, as it may be termed, on a commercial scale, either caustic soda or the soda-ash of commerce give excellent results.

As a soluble silica salt, the various soluble silicates may be employed; I have found both sodium silicate and potassium silicate to give excellent results, and in manufacturing practice I employ commercial sodium silicate solution.

As a water-soluble boron salt, any soluble borate may be used, but for manufacturing purposes commercial borax is well adapted to produce the desired result.

As a specific example of the several formulæ in which these alternative ingredients may be combined, I take:

10 grams of sodium carbonate, 10 grams of distilled water. These are mixed with heat sufficient to dissolve the sodium carbonate.

5 grams of borax are then added to the solution and heating is continued until the borax appears to be dissolved.

100 grams of commercial liquid sodium silicate are then added to this solution and the mixture is agitated by a continuous stirring, heat being continued until the composition becomes perfectly clear.

The resultant product may be packaged in any manner in which mucilage, glues, or the like adhesives are customarily prepared for the market, either in liquid or in solid granular form.

If any precipitate be found in the solution, the relationship between the alkali and silica ingredients must be slightly varied. Such precipitation is due to an excess of silica and may be readily overcome by increasing slightly the percentage of sodium carbonate or other alkali, or by slightly decreasing the percentage of borax. While there is some variation in the commercial silicates, borates, and carbonates, and while the several solutions may vary by reason of the fluctuating percentages of alkali or silica accordingly, even to the extent of altering the chemical and physical properties of the solutions, uniformity of product is attainable with the given formula by the correction of the precipitation, as described, as I have found that an increase in the amount of sodium carbonate or other alkali will overcome the precipitation and produce a clear solution. A perfectly clear adhesive compound may be readily attained which will stiffen up to a syrupy consistency and will maintain its form for a very considerable length of time so long as it is kept from air, and will harden upon exposure, like other non-mineral glues.

While I have described the best method now known to me for making, compounding, and using my improved adhesive, I do not wish to limit my claimed discovery to the precise ingredients recited, since any water-soluble alkaline borate may be employed, as, for example, in addition to those previously named, potassium borate, borate of lime, sodium borate, ammonium borate, etc., and any water-soluble alkaline silicate, and the term soda as used in the following claims is inclusive of both sodium hydroxid and sodium carbonate and the like water-soluble alkalis.

Having thus described my invention, I claim:

1. An adhesive composed of 80 parts of sodium silicate solution, 8 parts of sodium carbonate, 8 parts of water, and 4 parts of borax.

2. A clear transparent adhesive formed of 80 parts of soluble silicate solution, 4 parts of a water soluble borate, 8 parts additional water, and a sufficient quantity of soda (approximately 8 parts) to avoid precipitation.

WALTER ALEXANDER.